(12) United States Patent
Ahumada Perez

(10) Patent No.: US 8,806,804 B2
(45) Date of Patent: Aug. 19, 2014

(54) INJECTION PICK FOR DOSING SYSTEMIC AND NUTRITIONAL PRODUCTS INTO TREES AND PALMACEAE

(71) Applicant: Alfredo Ahumada Perez, Castellon (ES)

(72) Inventor: Alfredo Ahumada Perez, Castellon (ES)

(*) Notice: Subject to any disclaimer, the term of this patent is extended or adjusted under 35 U.S.C. 154(b) by 0 days.

(21) Appl. No.: 13/623,955

(22) Filed: Sep. 21, 2012

(65) Prior Publication Data

US 2013/0061519 A1  Mar. 14, 2013

Related U.S. Application Data

(63) Continuation of application No. PCT/ES2011/070377, filed on May 25, 2011.

(30) Foreign Application Priority Data

May 25, 2010  (ES) ................... 201000575 U

(51) Int. Cl.
*A01G 29/00* (2006.01)
*A01G 7/06* (2006.01)

(52) U.S. Cl.
CPC ........................ *A01G 7/06* (2013.01)
USPC .......................................... 47/57.5

(58) Field of Classification Search
USPC ................. 47/57.5, 48.5, 54, 52, 51, 58.1 R
IPC ............................................. A01G 7/06,29/00
See application file for complete search history.

(56) References Cited

U.S. PATENT DOCUMENTS

| | | | | |
|---|---|---|---|---|
| 3,295,254 A * | 1/1967 | Schoonman | ................... | 47/57.5 |
| 3,613,310 A * | 10/1971 | Rynberk | ................... | 47/48.5 |
| 3,864,874 A * | 2/1975 | Norris et al. | ................... | 47/57.5 |
| 3,968,594 A * | 7/1976 | Kawakami | ................... | 47/57.5 |
| 4,308,689 A * | 1/1982 | Jenson et al. | ................... | 47/57.5 |
| 4,342,176 A * | 8/1982 | Wolfe | ................... | 47/57.5 |
| 4,700,866 A * | 10/1987 | Taylor | ................... | 220/316 |
| 4,833,824 A | 5/1989 | Cronenwett et al. | | |
| 4,866,880 A * | 9/1989 | Weinblatt | ................... | 47/79 |
| 5,114,032 A | 5/1992 | Laidlaw | | |
| 5,207,021 A | 5/1993 | Merving | | |
| 5,797,215 A | 8/1998 | Doolittle et al. | | |
| 6,311,429 B1 * | 11/2001 | Wolfe | ................... | 47/57.5 |
| 7,178,286 B1 | 2/2007 | Doolittle | | |
| 7,225,585 B2 * | 6/2007 | Zayeratabat | ................... | 47/48.5 |
| 2001/0038804 A1* | 11/2001 | Norton | ................... | 422/28 |

FOREIGN PATENT DOCUMENTS

| | | |
|---|---|---|
| CA | 1089645 | 11/1980 |
| MX | PA00003662 | 8/2005 |
| WO | 2006/112802 | 10/2006 |

OTHER PUBLICATIONS

International Search Report issued Oct. 25, 2011 in International (PCT) Application No. PCT/ES/2011/070377.

* cited by examiner

*Primary Examiner* — Andrea Valenti
(74) *Attorney, Agent, or Firm* — Wenderoth, Lind & Ponack, L.L.P.

(57) ABSTRACT

The invention relates to an injection pick for dosing systemic and nutritional products into trees and Palmaceae. The invention is characterized in that, once installed in the trunk, it can repeatedly dose any type of systemic or nutritional product in an environmentally friendly manner. The invention comprises an easy-to-install plastic cannula formed by four interconnected parts and the design thereof allows the selected nutritional product or systemic insecticide to be easily applied, preventing continued wounds that could damage the trunk or stem of the plant. The invention comprises the following elements: pick, cover, latch and key.

8 Claims, 3 Drawing Sheets

INJECTION PICK FOR DOSING SYSTEMIC AND NUTRITIONAL PRODUCTS INTO TREES AND PALMACEAE

OBJECT OF THE INVENTION

The present invention, as expressed in the statement of the present specification, relates to an injection pick for dosing systemic and nutritional products into trees and Palmaceaes, which, once installed in the trunk, presents the distinguishing feature of being able to repeatedly dose any type of systemic or nutritional product in a repeated and environmentally friendly manner. This application system is addressed to the agricultural sector.

The invention comprises an easy-to-install plastic cannula, which has been designed and manufactured in order to obtain numerous and significant advantages with respect to other existing means with similar purposes for the treatment of pests and diseases in trees and Palmaceae. Said system is composed by four interconnected parts, in such a way that the design thereof allows the selected nutritional product or systemic insecticide to be easily applied, preventing continued wounds that could damage the trunk of the plant.

BACKGROUND OF THE INVENTION

Currently, other much more rudimentary and expensive systems or means for the execution of the operation of applying the nutritional products to plants are known, said systems or means consisted on continued perforations on the trunk of the plant due to the need for repeated applications. This causes problems related as to the application as to the risk of the possible infections that can appear. These application systems created several inconveniences that damaged the trunk of the plants, leaving them vulnerable to the attack of germs or fungi when the nutritional treatment was applied.

Prior to the system exposed in this specification, these application treatments were carried out by means of a perforation made with a drill that was subsequently sealed. The Palmaceae or the tree could remain damaged after the operation, being at risk of an infection.

Another more primitive and complex system is also known, carried out by means of a tool or awl, making extraction scratches on the trunk of the tree or the Palmaceae, removing the bark to apply said treatments, and then sealing it by impregnating the extraction scratches with mastic or with any other type of resin, which also made the tree or the Palmacee vulnerable to the risk of new infections.

With this system and in this manner, in one single step with the Injection Pick, we avoid damaging the tree or the Palmaceae when applying the systemic and nutritional systems, thus leaving a residue-free perforation that avoids a fungi infestation.

DESCRIPTION OF THE INVENTION

The present invention of the Injection Pick system is mainly composed by four pieces:
Pick
Cover
Catch
Key The injection pick system constitutes a novel manner in the agricultural sector for the application of nutritional products, carrying out the application in a very efficient manner regarding the previous ones due to its distribution characteristics. This system replaces the previous ones by a wide margin, which damaged the trees and Palmaceae during the disinfection and treatment works. With this system, unlike the previous ones, we eliminate a series of much more expensive tasks and applications, having time, cost and environmental protection implications at the same time.

The injection pick incorporates lateral orifices in its shape, which facilitate the distribution of the product once the perforation is made on the trunk for an improved assimilation. Likewise, the sharp shape of the injection pick in its end extremity makes easier the introduction. All of this makes easier the discharge of the product into the centre of the trunk of the tree or of the Palmaceae.

On the other hand, this injection pick incorporates two spurs, one in the upper part and the other one in the lower part, thus preventing the cannula from rotating once the cannula is placed inside the perforation. Final pins must be added to the foregoing, which favour a strong interlocking in the trunk of the tree, preventing the cannula from coming off, remaining in place in a tight and compact manner.

Next, in order to supplement the description being made and with the purpose of helping to provide a better understanding of the characteristics of the invention, a set of drawings is attached to this specification. On said figures the most typical features of the invention have been represented by way of illustration and not by way of limitation.

DESCRIPTION OF A PREFERRED EMBODIMENT OF THE INVENTION

Figure 1:
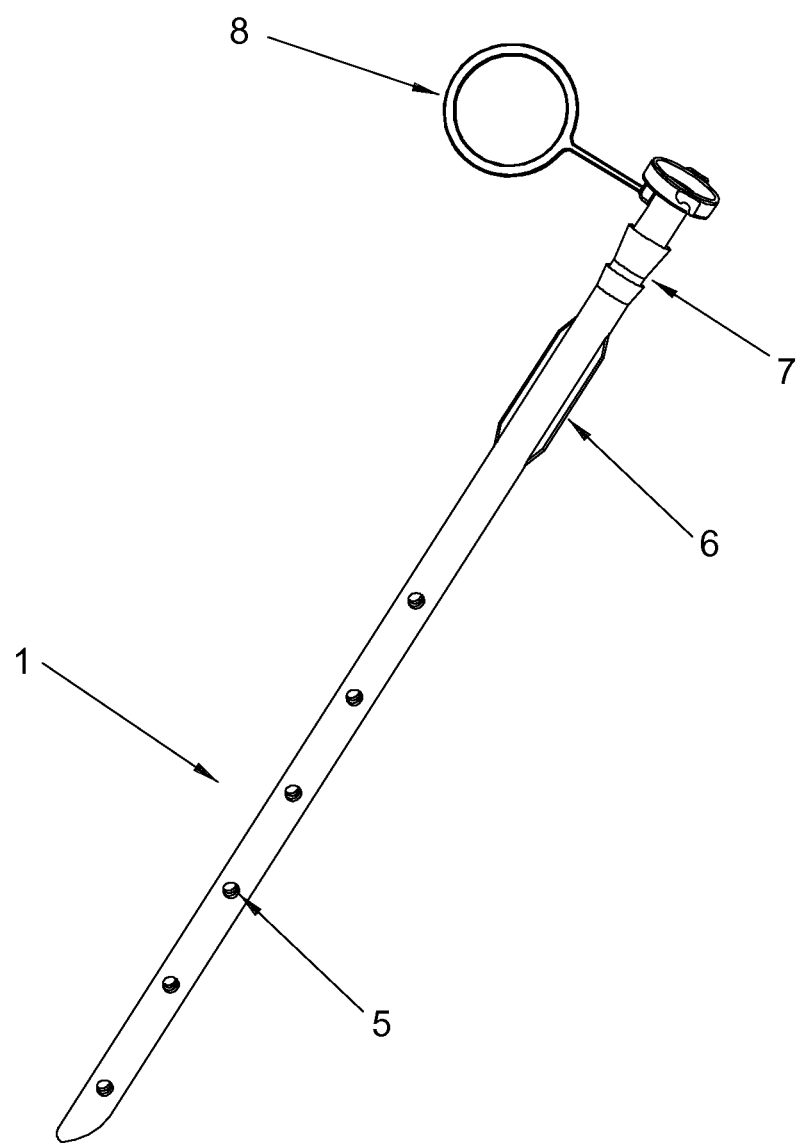
FIG. 1 shows a perspective view of the injection pick, observing a ring, the orifices, the lateral spurs and the spikes within.
Figure 2:
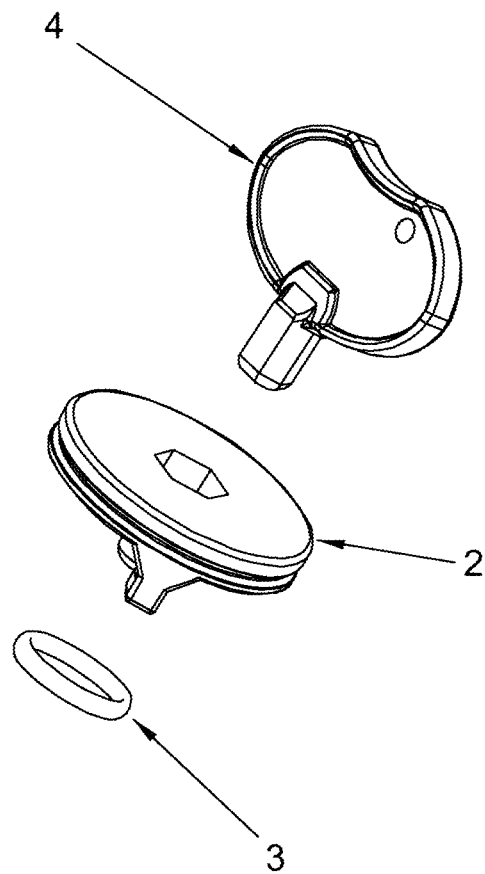
FIG. 2 shows a perspective view of the airtight closure cover, an O-ring and the release and locking key.
Figure 3:
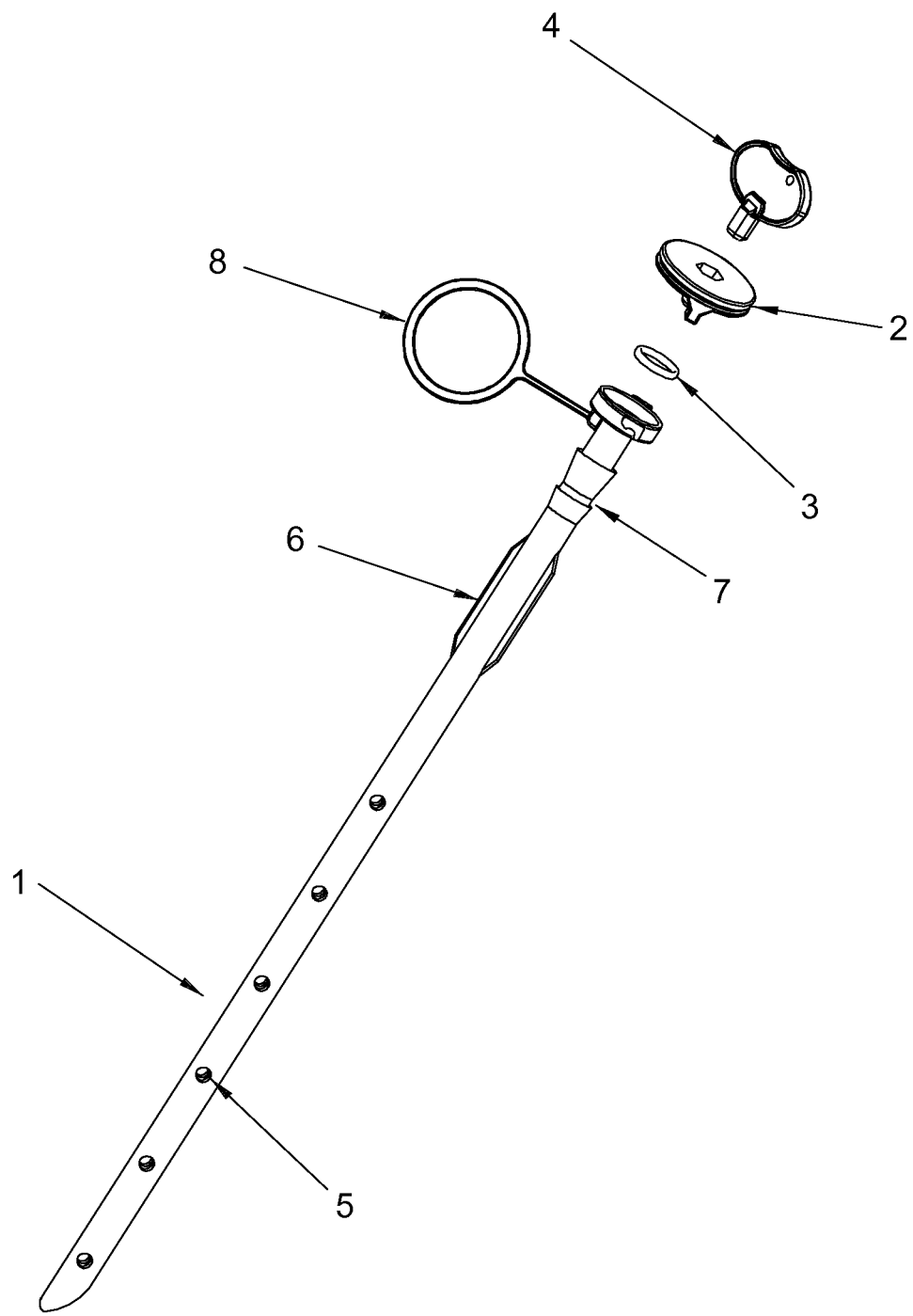
FIG. 3 shows a perspective view of the injection pick with all of its components for its full assembly.

According to the designs annexed, we can observe how this application system by means of an injection pick (1) consists of a cover for its airtight closure (2) and an O-ring (3) joint which can be coupled with one another, and a release and locking key (4). Said design, within its elongated shape, incorporates, in its upper part, orifices (5) with a sharp shape at the end, and, next to the filling nozzle, a lateral plasticized ring (8), which serves to hold the cover next to the pick and prevent a possible loss.

On the other hand, the injection pick (1) incorporates upper and a lower spurs (6) in its lateral side, preventing the cannula from rotating once the cannula is placed inside the perforation on the trunk of the tree or Palmaceae, which favours the carrying out of the task by the applying operator.

The end pins (for projections) (7) favour a strong interlocking, preventing the cannula from coming off once the installation is completed. These final pins (7) are found in the lower part of the filling nozzle of the injection pick (1). This way, the injection pick is perfectly fastened and immobilized, thus allowing the application operator to carry out the application of the systemic and nutritional products as many times as necessary without damaging the trunk of the tree in a repeated manner during the treatment and maintenance works.

The invention claimed is:

1. An injection pick for dosing systemic and nutritional products for trees and Palmaceae, the injection pick comprising:
    an elongated tubular-shaped body having first and second, opposite ends, said first end constituting a sharp end;
    wherein said elongated tubular-shaped body comprises lateral orifices disposed in a first end portion thereof adjacent said first end, fastening end projections disposed in a second end portion thereof adjacent said second end, and fixating spurs disposed in a middle portion thereof interposed between said first end portion and said second end portion, said fixating spurs being longitudinally spaced apart from said lateral orifices;
    wherein a filling cover is placed at said second end of said elongated tubular-shaped body;
    wherein a holding ring is connected to said filling cover for holding the filling cover in order to avoid loss of said filling cover; and
    wherein said fixating spurs of the elongated tubular-shaped body are arranged and configured to prevent said elongated tubular-shaped body from rotating inside the tree, and said fastening end projections are arranged and configured to prevent the elongated tubular-shaped body from coming off the tree.

2. An injection pick for dosing systemic and nutritional products for trees and Palmaceae, according to claim 1, wherein a solid key has an hexagonal shape in its lower part, in such a way that the key is configured to enter into the filling cover in a tight manner.

3. An injection pick for dosing systemic and nutritional products for trees and Palmaceae, according to claim 1, wherein said fastening end projections constitute radially outwardly projecting parts that project radially outwardly from the elongated tubular-shaped body.

4. An injection pick for dosing systemic and nutritional products for trees and Palmaceae, according to claim 1, wherein said holding ring includes a ring portion and a connecting portion extending away from the ring portion and connected to said filling cover, such that the ring portion is remote from said filling cover.

5. An injection pick for dosing systemic and nutritional products for trees and Palmaceae, according to claim 1, wherein the filling cover is provided with an O-ring and an airtight closure member, the airtight closure member having a key-receiving recess, and a solid key that is configured for receipt in the key-receiving recess for releasing and locking of the filling cover, to thereby provide for an improved security and assembly of the injection pick.

6. An injection pick for dosing systemic and nutritional products for trees and Palmaceae, according to claim 5, wherein the key-receiving recess and the solid key have hexagonal shapes, such that the key is configured to enter into the key-receiving recess of the airtight closure member of the filling cover in a tight manner.

7. An injection pick for dosing systemic and nutritional products for trees and Palmaceae, according to claim 5, wherein said fastening end projections constitute radially outwardly projecting parts that project radially outwardly from the elongated tubular-shaped body.

8. An injection pick for dosing systemic and nutritional products for trees and Palmaceae, according to claim 5, wherein said holding ring includes a ring portion and a connecting portion extending away from the ring portion and connected to said filling cover, such that the ring portion is remote from said filling cover.

* * * * *